United States Patent
Jung et al.

(10) Patent No.: US 8,726,301 B2
(45) Date of Patent: May 13, 2014

(54) COVER FOR AN OPTICAL DISC DRIVE AND OPTICAL DISC DRIVE HAVING THE SAME

(75) Inventors: Dong-ha Jung, Yongin-si (KR); Bo-won Hwang, Suwon-si (KR); Min-shik Roh, Seoul (KR); Byung-yeob Park, Suwon-si (KR); Se-yoon Kim, Seoul (KR); Ji-won Jung, Yongin-si (KR); Min-seok Ha, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 61 days.

(21) Appl. No.: 13/404,070

(22) Filed: Feb. 24, 2012

(65) Prior Publication Data

US 2012/0297402 A1 Nov. 22, 2012

(30) Foreign Application Priority Data

May 20, 2011 (KR) .......................... 10-2011-0048046

(51) Int. Cl.
  *G11B 17/028* (2006.01)
(52) U.S. Cl.
  USPC .......................................................... 720/655
(58) Field of Classification Search
  USPC .......................................................... 720/655
  See application file for complete search history.

(56) References Cited

U.S. PATENT DOCUMENTS

| | | | | |
|---|---|---|---|---|
| 6,948,176 B2* | 9/2005 | Cho et al. | ...................... | 720/600 |
| 7,194,745 B2* | 3/2007 | Ogasawara | ................... | 720/604 |
| 7,301,725 B2* | 11/2007 | Kim et al. | .................. | 360/99.18 |
| 8,305,707 B2* | 11/2012 | Kim | .......................... | 360/97.16 |
| 8,438,721 B1* | 5/2013 | Sill | ............................. | 29/603.03 |
| 2003/0128645 A1* | 7/2003 | Cho et al. | ...................... | 369/75.1 |
| 2005/0050567 A1* | 3/2005 | Takizawa et al. | ............. | 720/655 |
| 2007/0061824 A1* | 3/2007 | Makino | ......................... | 720/655 |
| 2007/0079314 A1* | 4/2007 | Chang | ........................... | 720/655 |
| 2010/0077417 A1* | 3/2010 | Wang et al. | ................... | 720/611 |

FOREIGN PATENT DOCUMENTS

| | | |
|---|---|---|
| KR | 10-0450796 B1 | 10/2004 |
| KR | 10-2006-0067741 A | 6/2006 |
| KR | 10-2009-0114134 A | 11/2009 |

OTHER PUBLICATIONS

Korean Office Action issued Oct. 12, 2012 in counterpart Korean Patent Application No. 10-2011-0048048 (4 pages, in Korean).

\* cited by examiner

*Primary Examiner* — Mark Blouin
(74) *Attorney, Agent, or Firm* — NSIP Law

(57) ABSTRACT

A cover for an optical disc drive. The cover includes: a body having a top portion that is configured to cover a disc if the disc is inserted into the optical disc drive, and a pressure structure formed on the body and having an asymmetrical shape.

22 Claims, 8 Drawing Sheets

COVER FOR AN OPTICAL DISC DRIVE AND OPTICAL DISC DRIVE HAVING THE SAME

CROSS-REFERENCE TO RELATED PATENT APPLICATION

This application claims the benefit of Korean Patent Application No. 10-2011-0048048, filed on 20 May, 2011, in the Korean Intellectual Property Office, the entire disclosure of which is incorporated herein by reference for all purposes.

BACKGROUND

1. Field

The following description relates to a cover that suppresses fluttering of a disc that rotates at a high speed in a housing, and an optical disc drive that includes the cover.

2. Description of the Related Art

In an optical disc drive, a strong air flow is generated inside a small space between a disc that rotates at a high speed and a top cover covering the disc. The strong air flow causes the disc to vibrate, and is generated in a complex manner based on rotation of the disc. In other words, air flows in a spiral shape due to a Coriolis effect at a surface of the disc and an effect of a viscous flow at a boundary layer, and air flows along an inner surface of the top cover toward a center portion of the disc where pressure is decreased.

The rotation of the disc, which causes such a complex air flow, generates an interaction between the disc and air. For example, the motion of the disc changes the flow of air, and the changed flow of air deforms the disc. Such an interaction increases as a speed of the disc increases. The interaction between the disc and the air causes the disc to flutter.

Fluttering of the disc deteriorates the stability of the disc. Severe fluttering of the disc may make it impossible to access the disc (i.e., to read and write data).

A pressure structure formed on the top cover increases rigidity of the top cover, thereby suppressing vibration of the top cover due to the air flow. However, the pressure structure affects the air flow in the small space between the disc and the top cover, and thus, needs to be suitably designed.

SUMMARY

In one general aspect, there is provided a cover for an optical disc drive. The cover includes a body having a top portion that is configured to cover a disc if the disc is inserted into the optical disc drive, and a pressure structure that is formed on the body and that has an asymmetrical shape.

The body may include a disc clamper corresponding to a spindle on which the disc is installed when the disc inserted into the optical disc drive.

The body may include at least a side portion corresponding to a main frame of the optical disc drive, and wherein the pressure structure is formed on the top portion of the body.

The pressure structure may have a symmetrical shape with respect to at least one of: (i) a first direction parallel to the disc if the disc is inserted into the optical disc drive, and (ii) a second direction which is perpendicular to the first direction.

The pressure structure may have a symmetrical shape with respect to at least one of: (i) a first direction parallel to the disc if the disc is inserted into the optical disc drive, and (ii) a second direction perpendicular to the first direction. The pressure structure may have an asymmetrical shape with respect to another direction.

The pressure structure may have a tetragonal shape on a plane of the body.

The pressure structure may have a bottom surface sunk toward the disc if the disc is inserted into the optical disc drive, and the bottom surface may be tilted toward a top surface of the disc if the disc is inserted into the optical disc drive.

The bottom surface may be flat.

The pressure structure may include at least one side wall having an asymmetrical height that is formed around the bottom surface. The bottom surface may be flat.

The pressure structure may have an asymmetrical shape around a center portion of the disc.

In another aspect, there is provided a cover for an optical disc drive. The cover includes a body covering a disc installed onto a spindle of an optical disc drive, and the body comprising: (i) a top portion comprising a disc clamper corresponding to the spindle, and (ii) a side portion corresponding to a main frame of the optical disc drive; and a pressure structure formed on the top portion, the pressure structure having an asymmetrical shape with respect to a center portion of the disc, and having a symmetrical shape with respect to at least one of a first direction parallel to the disc and a second direction which is perpendicular with respect to the first direction.

The pressure structure may have a tetragonal shape on a plane of the body.

The pressure structure may have a bottom surface sunken toward the disc, wherein the bottom surface is tilted toward a top surface of the disc.

In another aspect, there is provided an optical disc drive. The optical disc drive includes a main frame having installed thereto (i) a spindle motor onto which a disc is installed, and (ii) an optical pickup, and a cover operatively combined with the main frame. The cover may include a body covering the disc, and a pressure structure that is formed on the body and that has an asymmetrical shape.

The body may include a disc clamper corresponding to the spindle.

The body may include a top portion on which the pressure structure is formed, and a side portion corresponding to a side of the main frame.

The pressure structure may include a symmetrical shape with respect to at least one of a first direction parallel to the disc and a second direction perpendicular to the first direction.

The pressure structure may include a bottom surface that is sunken toward the disc, and the bottom surface is tilted toward a top surface of the disc.

The pressure structure may include at least one side wall having an asymmetrical height that is formed around the bottom surface. The bottom surface may be flat.

The pressure structure may include a bottom surface sunken toward the disc, and the bottom surface may be tilted toward a top surface of the disc.

The pressure structure may include at least one side wall having an asymmetrical height that is formed around the bottom surface. The bottom surface may be flat.

In another aspect, there is provided a cover for an optical disc drive. The cover includes a body having a top portion that is configured to cover a disc if the disc is inserted into the optical disc drive, and a pressure structure that is formed on the body. The pressure structure is configured such that a distance between a top surface of the disc and a bottom surface of cover is different between at least one set of opposing sides of the top surface of the disc.

Other features and aspects may be apparent from the following detailed description, the drawings, and the claims.

Figure 1:
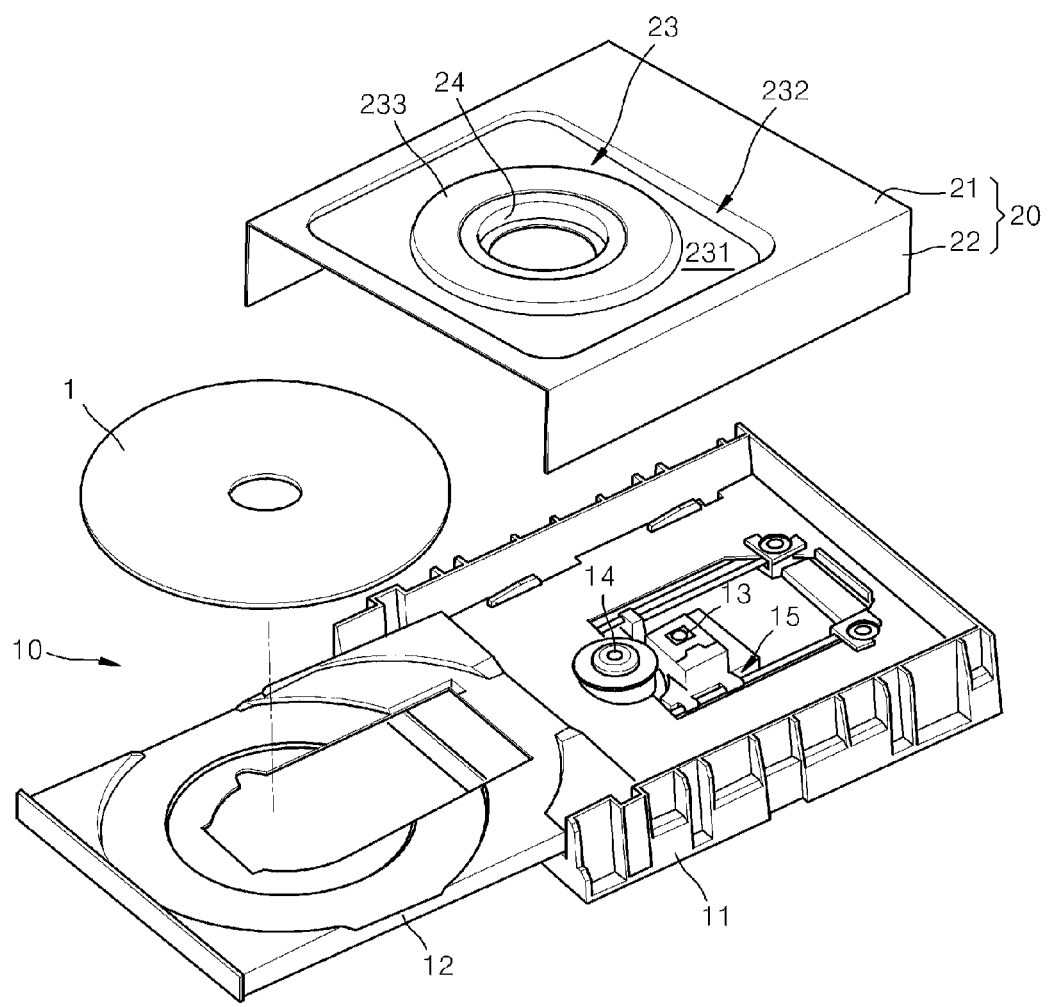
FIG. 1 is drawing illustrating an example of a cover that reduces fluttering of a disc in an optical disc drive that includes the cover.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is an exploded perspective view of an example of a cover 20 that is configured to reduce fluttering of a disc loaded in an optical disc drive that includes the cover.

Referring to FIG. 1, the optical disc drive includes a main body 10 and the cover 20 covering the main body 10. The main body 10 includes a main frame 11 that supports the entire structure of the optical disc drive. For example, the main frame supports a tray 12 that is configured to accommodate a disc 1 (e.g., a CD, DVD, BD, or the like) in order to transfer the disc 1 into and out of the main frame 11, and a spindle 14 onto which the disc 1 is installed if the disc 1 is transferred into the main frame 11. The main frame 11 further supports an optical pickup 13 and a transfer unit 15 of the optical pickup 13. The optical pickup 13 is positioned relative to a recording surface of the disc 1 installed onto the spindle 14. The transfer unit 15 is configured to transfer the optical pickup 13. For example, the transfer unit 15 may transfer the optical pickup 13 as the optical pickup reads/write data to or from the recording surface of the disc 1.

Meanwhile, a body of the cover 20 covering the main body 10 includes a top portion 21 corresponding to the top of the main frame 11 or a top surface of the disc 1, and at least two side portions 22 respectively corresponding to the at least two sides of the main frame 11. The top portion 21 has formed thereon a pressure structure 23. The pressure structure 23 may be configured to reduce fluttering of a disc during a high speed operation. As an example, the pressure structure 23 may be formed so to include at least one protrusion formed in the top portion. In other words, the pressure structure 23 may include portions which relative to other areas of the top portion 21 are sunken in an approximately tetragonal shape toward the main frame 11. The portions of the pressure structure 23 which are sunken toward the main frame 11, may have approximately a tetragonal shape. The pressure structure 23 is prepared on the top portion 21. As an example, the pressure structure 23 may include a clamper socket 24 in which a disc clamper 30 is installed. The clamper 30 may be rotatably installed in the clamper socket 24. As an example, the clamper socket 24 may be formed in the center of the pressure structure 23.

Figure 2:
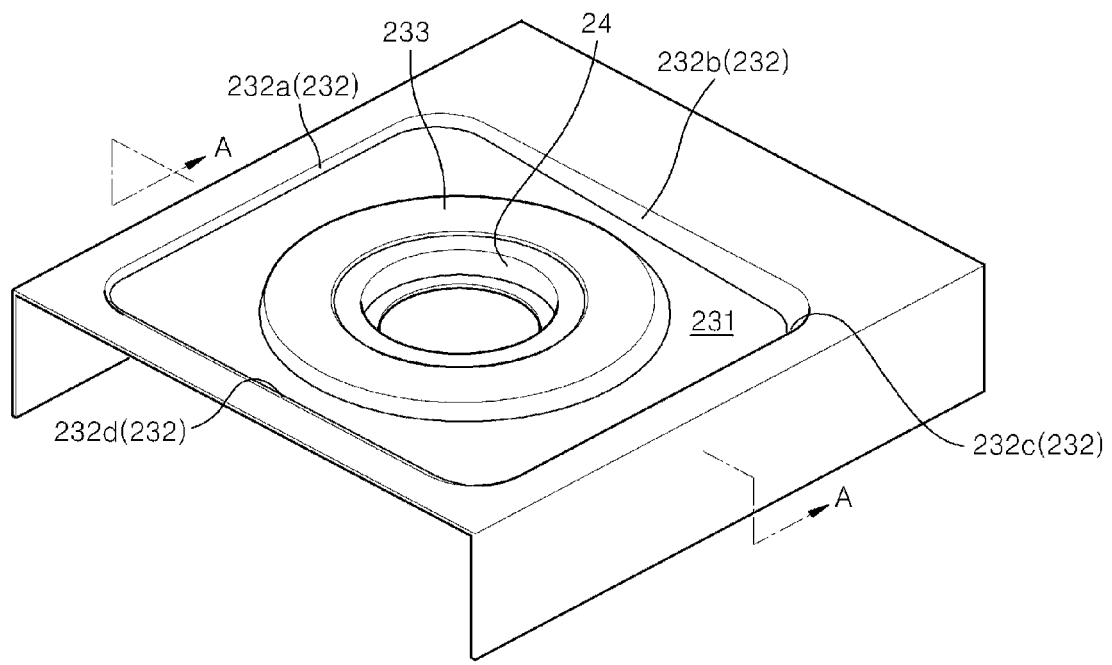
FIG. 2 is a drawing illustrating an example of a cover for an optical disc drive.

The pressure structure 23 has a bottom surface 231. As an example, the bottom surface 231 of the pressure structure 23 may be formed so as to not be parallel with a top surface of the disc 1. In other words, the bottom surface 231 may tilt toward the top surface of the disc 1. The bottom surface 231 may have a tetragonal edge shape. For example, the pressure structure 23 has the bottom surface 231 which is sunken from the top portion 21 and which is flat. The pressure structure 23 includes side walls 232. The side walls 232 may define the pressure structure. For example, the side walls 232 may define boundary in which the bottom surface 231. The bottom edge of the side walls 232 may be tilted at portions where side walls 232 meet sides of the bottom surface 231 which tilt. The pressure structure 231 may also include a protruding unit 233 which protrudes from the bottom surface 231. The protruding unit may have a donut shape at the center thereof. As an example, the bottom surface 231 is flat overall. The bottom surface 231 may have a varying height which is different from that of the top surface of the disc 1. For example, the bottom surface 231 may have a varying height relative to the top surface of the disc 1 based on the bottom surface 231 being tilted. Accordingly, as shown in FIG. 2, the side wall 232 surrounding the bottom surface 231 includes first through fourth side walls 232a, 232b, 232c, and 232d. As an example, heights of the first and third side walls 232a and 232c are different overall from each other, and heights of the second and fourth side walls 232b and 232d gradually increase from the first side wall 232a to the second side wall 232c in a tapered manner.

Figure 3:
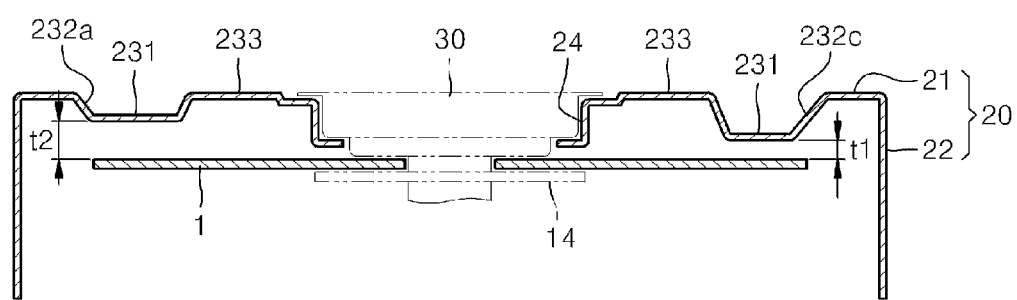
FIG. 3 is a drawing illustrating an example of a cross-sectional view taken along a line A-A of FIG. 2.

FIG. 3 is a drawing illustrating an example of a cross-sectional view taken along a line A-A of FIG. 2. For example, FIG. 3 shows a relationship between the disc 1 and the bottom surface 231 of the cover 20. As shown in FIG. 3, a gap between the bottom surface 231 and the disc 1 at the left of the drawing farthest from the top surface of the disc 1 is t2, and a gap between the bottom surface 231 and the disc 1 at the right of the drawing is t1. In this example, t2 is larger than t1. Such a height difference causes a local pressure difference on the top surface of the disc 1. For example, when the disc 1 installed by the disc clamper 30 onto the spindle 14 is rotated at a high speed. As the disc 1 is rotated, the height difference causes a local pressure difference on the top surface of the disc 1.

Figure 4:
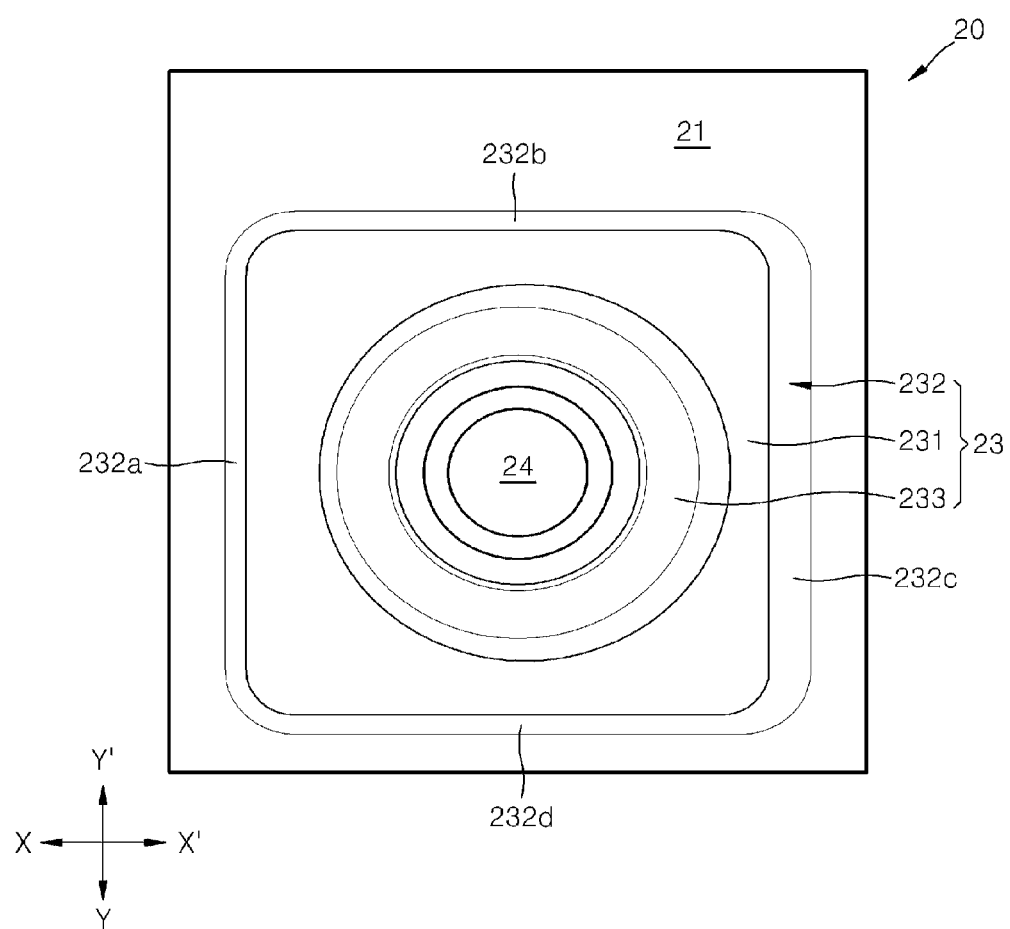
FIG. 4 is a drawing illustrating an example of a cover that reduces fluttering of a disc in an optical disc drive.
Figure 5:
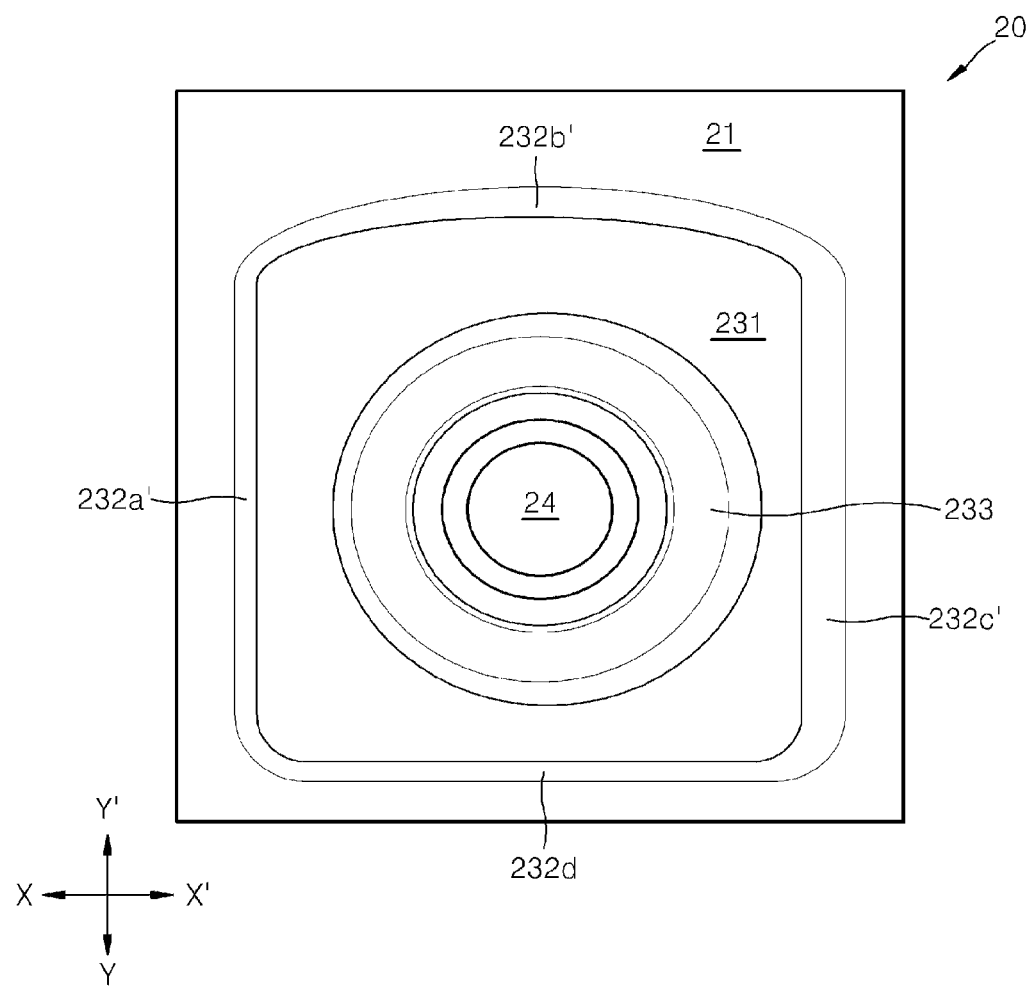
FIG. 5 is a drawing illustrating an example of a cover for an optical disc drive.

A pressure on the top surface of the disc 1 varies based at least in part on a depth or height of the bottom surface 231 of the pressure structure 23. FIG. 4 is a drawing illustrating an example of the cover 20. With reference to FIG. 4, as an example, the local pressure difference may be applied when the pressure structure 23 has an approximately symmetrical shape in right and left (x-x') and top and bottom (y'-y) directions in a plane overall as shown in FIG. 4. As another example, the pressure structure 23 may have an approximately symmetrical shape only in the right and left or top and bottom directions. FIG. 5 shows a pressure structure 23' that is symmetrical in right and left directions based on a border line of top and bottom (y'-y) directions. Referring to FIG. 5, the pressure structure 23' has first through fourth side walls 232a', 232b', 232c', and 232d'. Here, the first, third, and fourth side walls 232a', 232c', and 232d' respectively correspond to the first, third, and fourth side walls 232a, 232c, and 232d. The second side wall 232b' may have a curved arc shape (or an arc shape). With reference to FIGS. 4 and 5, the second side wall 232b' corresponds to the side wall 232b described above. Accordingly, FIG. 5 illustrates that the pressure structure 23' may have an approximately symmetrical shape only with respect to one direction. As an example, bottom surface 231 of the pressure structure 23 may have a size sufficient enough to cover the top surface of the disc 1.

As described above, the bottom surface 231 of the pressure structure 23 or 23' is tilted toward the top surface of the disc 1 so as to partially differentiate a pressure on the top surface of the disc 1.

In a conventional technology, a gap between a bottom surface of a pressure structure (e.g., of the cover) and a disc is constant overall across the top surface of the disc 1. However, a disc flutters or vibrates due to such a constant gap.

An optical drive records or writes data to a disc by rotating a disc at one of various rotating speeds at a frequency from 30 Hz to 230 Hz. However, an operation in such a wide range causes a disc resonance phenomenon while recording or reproducing data. Specifically, an abnormal disc resonance phenomenon may be generated at a certain rotating speed. Such an abnormal disc resonance makes it difficult to record or reproduce data. The abnormal disc resonance phenomenon is typically generated in a half-height (HH) type high speed optical disc drive.

A pressure structure is introduced to suppress fluttering of a disc during operation in which the disc is rotated a high speed operation. However, if a gap between the bottom surface of the pressure structure or of the cover and the top surface of the disc is constant overall, a space between the disc and a cover constantly narrows by a height or depth of the pressure structure. If the gap between the bottom surface of the pressure structure and the top surface of the disc is constant overall, then air supplied to the center of the disc along an inner surface of the cover is restricted and a flow rate of air flowing from a center portion of the disc to a peripheral portion of the disc is increased. Accordingly, a pressure on the top surface of the disc is lower than a pressure on the inner surface of the cover. Such a pressure reduction decreases fluttering of the disc driven at a high speed, but increases fluttering of the disc at a low speed compared to the case when a cover without a pressure structure is used because of the narrow space between the disc and the cover.

However, use of a pressure structure that includes a tilted bottom surface (e.g., a pressure structure having an asymmetrical shape), in order to generate a pressure difference on a top surface of a disc, fluttering of a disc generated during a high speed operation may be suppressed. In addition, such a pressure structure may suppress vibration of the disc that may be generated as the disc is rotated during a low speed operation.

For example, with reference to FIG. 3, the bottom surface 231 of the pressure structure 23 formed on the top portion 21 of the cover 20 causes the air flow to generate different effects at the right and left of the top surface of the disc 1. The different effects at the right and left areas of the top surface of the disc which are generated by the air flow, reduces both resonance and fluttering of the disc 1 generated at low and high speed operations. The pressure structure 23, specifically the bottom surface 231 of the pressure structure 23, interrupts the air flow between an inner side and an outer side of the bottom surface 231, and presses the disc 1. For example, a depth of the bottom surface 231 may be 2 mm at the left and 4 mm at the right. In other words, a depth of the first side wall 232a may be 2 mm and a depth of the third side wall 232c may be 4 mm.

Figure 6:
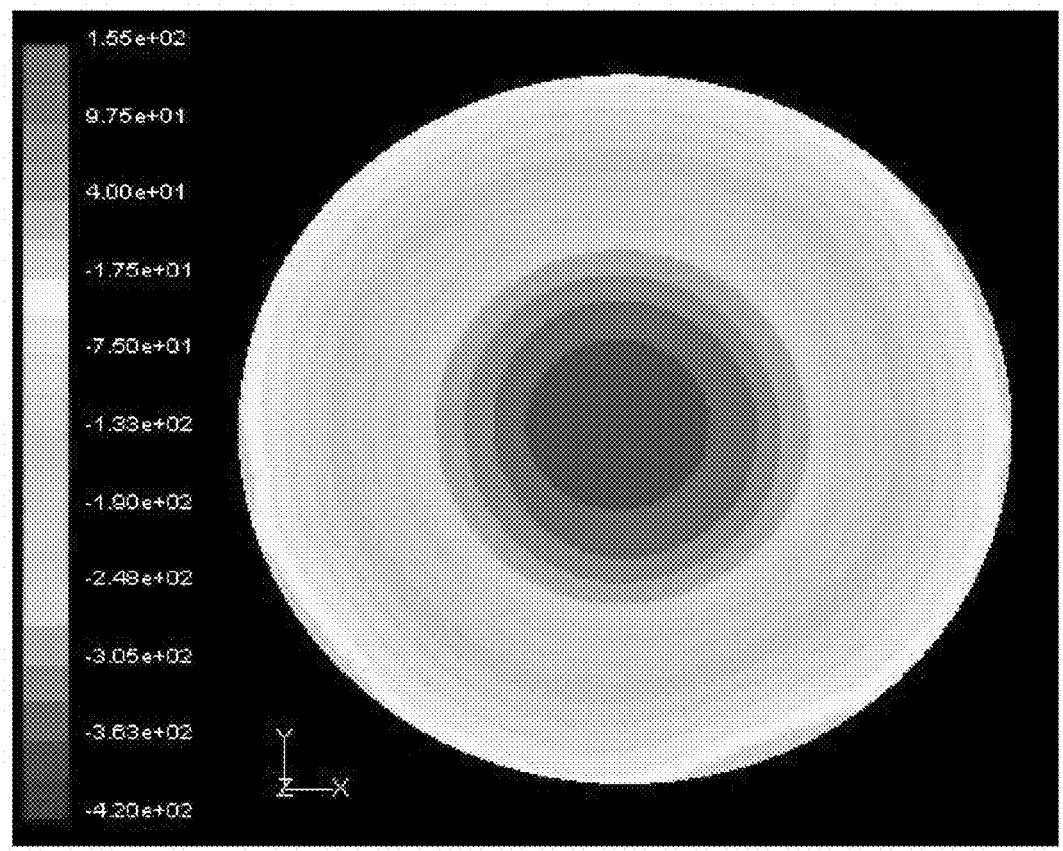
FIGS. 6, 7, and 8 are drawings illustrating an example of pressure distributions on a top surface of a disc respectively caused by two conventional covers and a cover such as, for example, the cover illustrated in FIG. 1.
Figure 7:
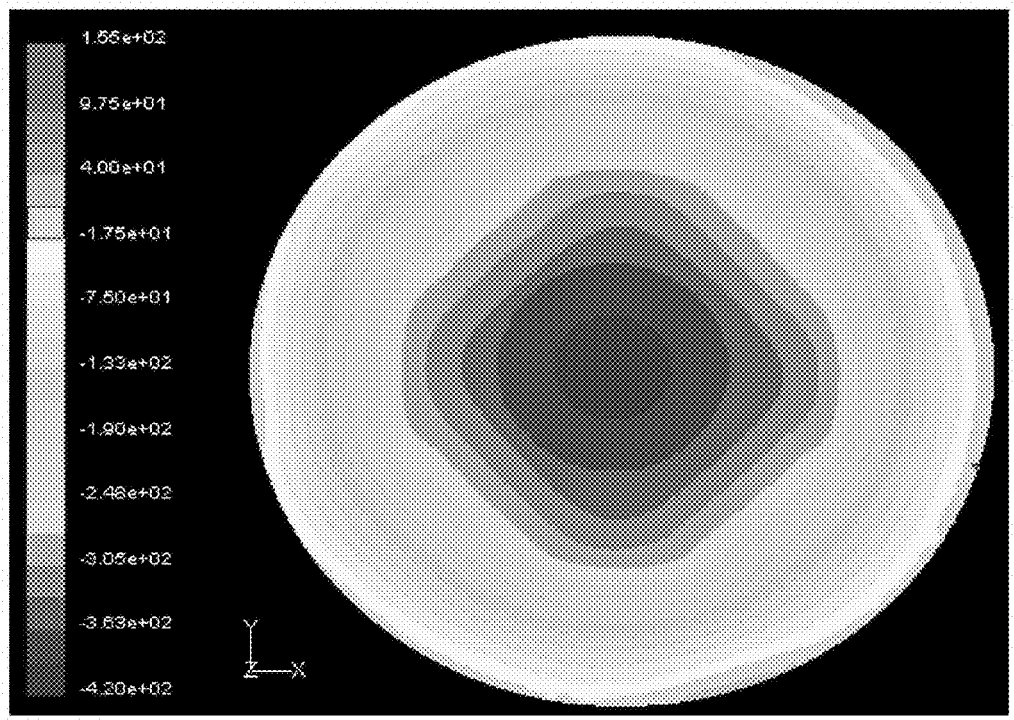
Figure 8:
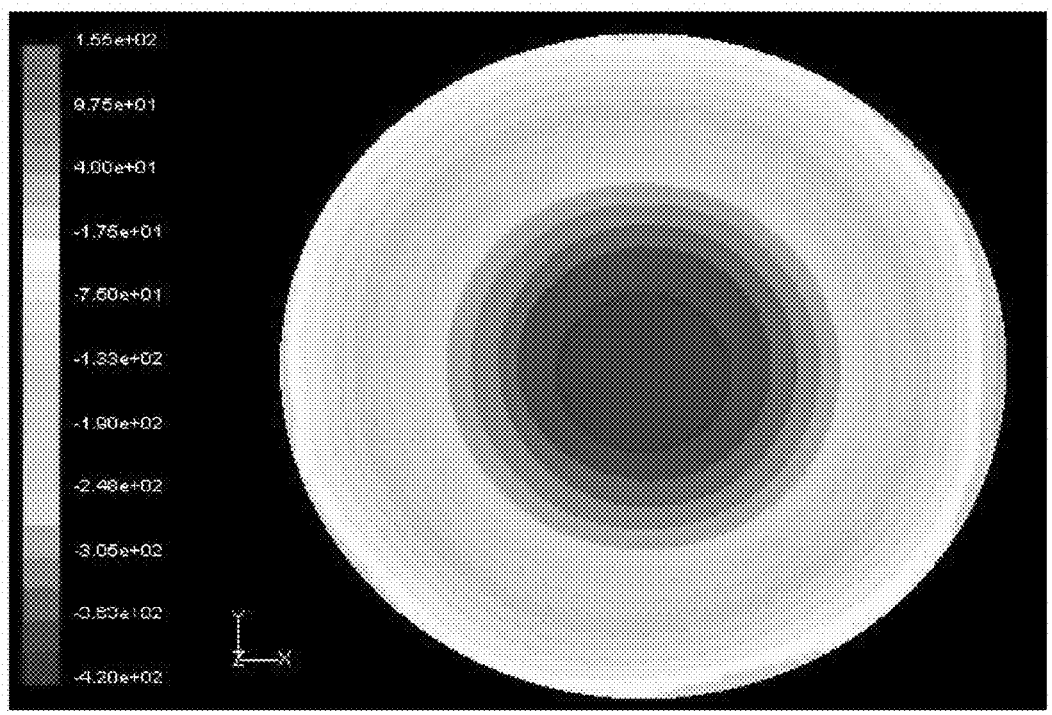

As described above, air flows due to a rotation of a disc when the disc is rotated in an optical disc drive. Based on the rotation of the disc, the air rotates in a spiral shape from an inner perimeter (center portion) to an outer perimeter (peripheral portion) of the disc. Accordingly, the air presses the disc differently across portions of the disc. In other words, the air pressure between the cover 20 and the top surface of the disc varies across the surface of the disc. In order to understand such an air flow, the air flow was analyzed based on a pressure distribution in a normal state. FIGS. 6 through 8 are graphs illustrating pressure distributions on a top surface of a disc. FIG. 6 illustrates a pressure distribution on a top surface of a disc in an optical disc drive having a conventional cover (Conventional Structure 1) that includes a flat top portion without a pressure structure. FIG. 7 illustrates a pressure distribution on a top surface of a disc in an optical disc drive having a conventional cover (Conventional Structure 2) that includes a pressure structure having the same depth or height. FIG. 8 illustrates a pressure distribution on a top surface of a disc in an optical disc drive having a cover that includes a pressure structure having different or varying depth or height.

Referring to the pressure distributions at the center portions of the disc in FIGS. 6 through 8, a dark region showing a low pressure is the smallest in the Conventional Structure 1 of FIG. 6, and thus, a pressure in a middle portion between the center portion and the peripheral portion of the disc is higher in the Conventional Structure 1 of FIG. 6 than the Conventional Structure 2 illustrated in FIG. 7 and an aspect illustrated in FIG. 8 where the pressure structure is used.

Meanwhile, a pressure in the center portion is the lowest in the Conventional Structure 2 of FIG. 7 using a pressure structure that has the same height. The pressure distribution of an aspect illustrated in FIG. 8, which has a pressure structure having different heights, is a medium pressure distribution compared to the pressure distributions of the Conventional Structures 1 and 2 of FIGS. 6 and 7. In other words, the pressure distribution according to an aspect has a pressure at the center portion of the top surface of the disc that is higher than the pressure in the center portion of a disc in a Conventional Structure 2, and that is lower than the pressure in the center portion of a disc in the Conventional Structure 1. The air flowing from the inner perimeter to the outer perimeter or from the outer perimeter to the inner perimeter of the disc is restricted by the pressure structure, and thus, the air flow decreases a pressure on the inner perimeter and increases a pressure on the outer perimeter. Accordingly, the pressure structure suppresses fluttering of the disc generated due to an interaction between the air and the disc when the disc is rotated at a high speed.

Figure 9:
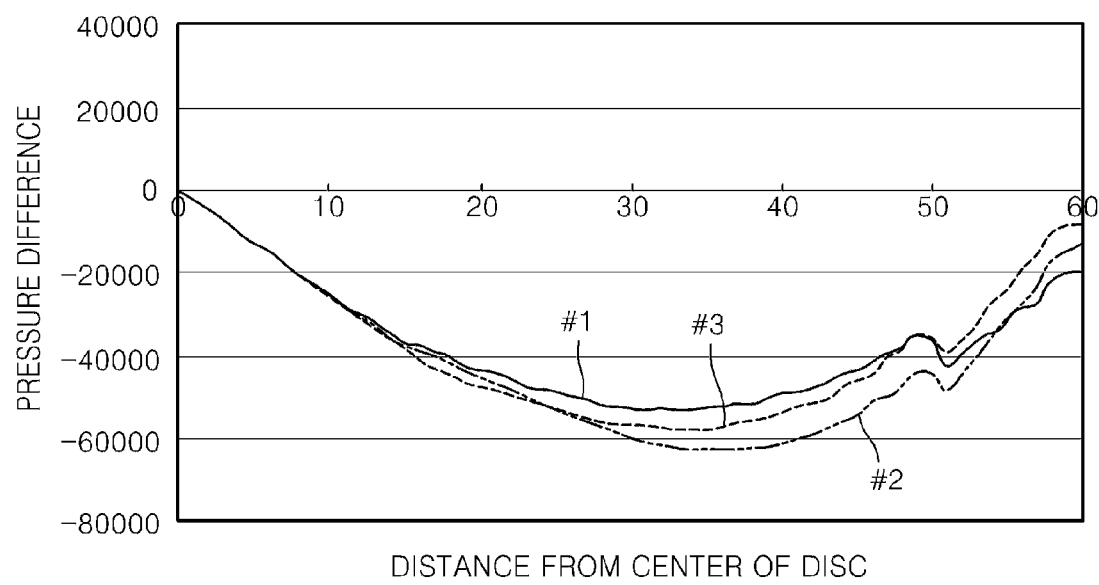
FIG. 9 is a graph showing pressure differences between top and bottom surfaces respectively of two conventional covers and a cover according to an aspect, such as, for example, the cover illustrated in FIG. 1.

The pressure distributions of FIGS. 6 through 8 are clarified based on the graph of FIG. 9. For example, FIG. 9 illustrates pressure differences between top and bottom surfaces of a disc according to a shape of a cover or pressure structure, and according to a location of the disc. In FIG. 9, #1 denotes an optical disc drive having the cover of the Conventional Structure 1 without a pressure structure, #2 denotes an optical disc drive having the cover of the Conventional Structure 2 which includes a tetragonal pressure structure having the same height, and #3 denotes an optical disc drive which includes the cover of according to an aspect.

A disc flutters less if a pressure difference between top and bottom surfaces on a center portion of the disc is high. Because fluttering is generated due to an interaction between the disc and air, the fluttering is reduced by reducing this interaction. The high pressure difference between the top and bottom surfaces of the disc in the center portion is generated due to a low pressure on the top surface. Accordingly, air density on the top surface reduces the fluttering generated due to the interaction between the disc and the air.

However, in order to reduce resonance of the disc, the pressure applied to the top and bottom surfaces of the disc may be constant overall because the resonance prevents the disc from deforming. Accordingly, the cover of an optical disc according to an aspect (e.g., illustrated as #3 in FIG. 9) which generates a small pressure difference throughout entire area of the disc may be used. Such a cover may operate as an air damper that reduces disc deformation.

Thus, in order to suitably deal with the fluttering and resonance of the disc, the disc needs to have a suitable pressure distribution. The cover of an optical disc according to one aspect, optimizes the pressure distribution of the disc for both high and low speed operations because the cover restricts the air flow at one side of the disc and facilitates the air flow at another side of the disc.

Table 1 below shows deformation sizes of discs according to the covers of the Conventional Structures 1 and 2 and embodiment structure according to one example described herein, such as, for example, the cover illustrated in FIG. 2.

TABLE 1

| | Conventional Structure 1 | Conventional Structure 2 | A Structure according to one Example described herein |
|---|---|---|---|
| Deformation Size of Disc | 70 μm | 170 μm | 60 μm |

Referring to Table 1, the cover according to an example described herein is most advantageous in terms of the amount of deformation of the disc. As a result, the cover according to an example described herein, which includes the pressure structure having an asymmetrical height, decreases the disc deformation due to the resonance generated at a low speed operation and effectively reduces the fluttering of the disc generated at a high speed operation of an optical disc drive for recording data on an optical disc, such as a CD, a DVD, or a BD. Accordingly, the optical disc drive can stably record data on the disc.

In one aspect, there is provided a cover that is configured to effectively suppress vibration of a disc, and an optical disc drive having the cover.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cover for an optical disc drive, the cover comprising:
   a body comprising a top portion that is configured to cover a disc in response to the disc being inserted into the optical disc drive; and
   a pressure structure that is formed on the body,
   wherein a cross section of the pressure structure at a plane which intersects a center portion of the disc and is perpendicular to a side portion of the cover is asymmetrical about a line which intersects the center portion of the disc and is parallel to the side portion of the cover.

2. The cover of claim 1, wherein the body comprises a disc clamper corresponding to a spindle on which the disc is installed when the disc inserted into the optical disc drive.

3. The cover of claim 1, wherein the body comprises at least a side portion corresponding to a main frame of the optical disc drive, and wherein the pressure structure is formed on the top portion of the body.

4. The cover of claim 1, wherein the pressure structure has a symmetrical shape with respect to at least one of:
   a first direction parallel to the disc if the disc is inserted into the optical disc drive, and
   a second direction which is perpendicular to the first direction.

5. The cover of claim 1, wherein
   the pressure structure has a symmetrical shape with respect to at least one of:
   a first direction parallel to the disc if the disc is inserted into the optical disc drive, and
   a second direction perpendicular to the first direction; and
   the pressure structure has an asymmetrical shape with respect to a third direction.

6. The cover of claim 1, wherein the pressure structure has a tetragonal shape on a plane of the body.

7. The cover of claim 1, wherein the pressure structure has a bottom surface sunk toward the disc in response to the disc being inserted into the optical disc drive, and the bottom surface gradually tilts towards a top surface of the disc throughout an entire length of the bottom surface.

8. The cover of claim 7, wherein the bottom surface is flat.

9. The cover of claim 7, wherein
   the pressure structure comprises at least one exterior side wall having an asymmetrical height that is formed around an outside portion of the bottom surface; and
   the bottom surface is flat.

10. A cover for an optical disc drive, the cover comprising:
    a body covering a disc installed onto a spindle of an optical disc drive, the body comprising a top portion comprising a disc clamper corresponding to the spindle, and a side portion corresponding to a main frame of the optical disc drive; and
    a pressure structure formed on the top portion, the pressure structure comprising a symmetrical shape with respect to at least one of a first direction parallel to the disc and a second direction which is perpendicular with respect to the first direction,
    wherein a cross section of the pressure structure at a plane which intersects a center portion of the disc and is perpendicular to the side portion of the cover is asymmetrical about a line which intersects the center portion of the disc and is parallel to the side portion of the cover.

11. The cover of claim 10, wherein the pressure structure has a tetragonal shape on a plane of the body.

12. The cover of claim 10, wherein
    the pressure structure has a bottom surface sunken toward the disc; and
    the bottom surface gradually tilts towards a top surface of the disc throughout an entire length of the bottom surface.

13. An optical disc drive comprising:
a main frame comprising
a spindle motor onto which a disc is installed, and
an optical pickup; and
a cover, operatively combined with the main frame, comprising
a body covering the disc, and
a pressure structure that is formed on the body,
wherein a cross section of the pressure structure at a plane which intersects a center portion of the disc and is perpendicular to a side portion of the cover is asymmetrical about a line which intersects the center portion of the disc and is parallel to the side portion of the cover.

14. The optical disc drive of claim 13, wherein the body comprises a disc clamper corresponding to the spindle.

15. The optical disc drive of claim 13, wherein the body comprises a top portion on which the pressure structure is formed, and the side portion corresponding to a side of the main frame.

16. The optical disc drive of claim 13, wherein the pressure structure has a symmetrical shape with respect to at least one of a first direction parallel to the disc and a second direction perpendicular to the first direction.

17. The optical disc drive of claim 13, wherein
the pressure structure has a bottom surface that is sunken toward the disc; and
the bottom surface gradually tilts towards a top surface of the disc throughout an entire length of the bottom surface.

18. The optical disc drive of claim 17, wherein
the pressure structure comprises at least one exterior side wall having an asymmetrical height that is formed around an outside portion of the bottom surface; and
the bottom surface is flat.

19. The optical disc drive of claim 14, wherein
the pressure structure has a bottom surface sunken toward the disc; and
the bottom surface gradually tilts towards a top surface of the disc throughout an entire length of the bottom surface.

20. The optical disc drive of claim 19, wherein
the pressure structure comprises at least one exterior side wall having an asymmetrical height that is formed around an outside portion of the bottom surface; and
the bottom surface is flat.

21. The cover of claim 1, wherein the pressure structure has an asymmetrical shape around a center portion of the disc.

22. A cover for an optical disc drive, the cover comprising:
a body comprising a top portion that is configured to cover a disc in response to the disc being inserted into the optical disc drive; and
a pressure structure that is formed on the body,
wherein the pressure structure is configured such that a distance between a top surface of the disc and a bottom surface of the cover is different between at least one set of opposing side edges of the top surface of the disc.

* * * * *